United States Patent [19]

Olson et al.

[11] Patent Number: 4,732,750

[45] Date of Patent: Mar. 22, 1988

[54] PREPARATION OF MONODISPERSE TITANIA BY TITANIUM ALKOXIDE HYDROLYSIS

[75] Inventors: William L. Olson, Des Plaines; William E. Liss, Villa Park, both of Ill.

[73] Assignee: Allied-Signal Inc., Morristown, N.J.

[21] Appl. No.: 895,392

[22] Filed: Aug. 11, 1986

[51] Int. Cl.$^4$ .............................................. C01G 25/02
[52] U.S. Cl. .................................. 423/608; 423/609; 423/610; 501/1
[58] Field of Search ....................... 423/608, 609, 610; 501/1

[56] References Cited

U.S. PATENT DOCUMENTS

| | | | |
|---|---|---|---|
| 3,973,975 | 8/1976 | Francel et al. | 501/15 |
| 4,459,245 | 7/1984 | Ryon et al. | 264/14 |
| 4,543,341 | 9/1985 | Barringer et al. | 501/1 |
| 4,619,908 | 10/1986 | Cheng et al. | 423/338 |

OTHER PUBLICATIONS

"Formation, Packing and Sintering of Monodisperse TiO$_2$ Powder", Communications of the American Ceramic Society, E. Barringer et al., 12-1982, pp. 199-201.
"Preparation of Zirconia-Alumina Powders by Zirconium Alkoxide Hydrolysis", C of the ACS, B. Fegley et al., 2-1985, pp. 60-62.

*Primary Examiner*—Patrick P. Garvin
*Assistant Examiner*—Paige C. Harvey
*Attorney, Agent, or Firm*—Thomas K. McBride; John F. Spears, Jr.; E. Jerome Maas

[57] ABSTRACT

This invention relates to a process for reproducibly forming monodisperse titania spheres by the hydrolysis of titanium alkoxides in the presence of an amine containing additive in such a way as to constrain the particle size within a narrow range.

13 Claims, No Drawings

PREPARATION OF MONODISPERSE TITANIA BY TITANIUM ALKOXIDE HYDROLYSIS

BACKGROUND OF THE INVENTION

Ceramic materials offer a wide variety of possible physicochemical characteristics which are controlled by the inherent atomic structure and microstructure of the material. Their refractory nature and chemical inertness allow for the use of these materials in environments where conventional materials such as polymers do not survive. Although the potential for growth in new application areas is very strong, their use is actually limited by processing technology which cannot adequately meet the purity, strength, homogeneity, and microstructure requirements of high performance ceramic applications.

It has been estimated that for a typical process which manufactures a high value added ceramic product, the cost of rejecting materials which do not meet specifications is generally in the range of 25 to 75% of the total manufacturing cost for a particular item. These numbers, which reflect processes which use conventional ceramic powders and processing technology are clearly unacceptable and provide much of the stimulus for the resurgence of interest in the development of new or improved ceramic raw materials based on sol-gel and polymeric precursor chemistry.

Many of the current limitations to the use of ceramics in the high technology areas are a direct consequence of the physicochemical properties of the powders used in their fabrication. The raw material powder's average particle size, particle size distribution, agglomerate levels, and dispersion characteristics combine to limit the macroscopic homogeneity in the ceramic's green and final sintered state. The microstructural homogeneity of the ceramic can be optimized by processing powders where these characteristics are tightly controlled. Monodisperse metal oxide powders derived by sol-gel processes are prime examples of materials in this form.

Monodisperse metal oxide powders offer many processing advantages over conventional ceramic powders. The spherical shape and narrow particle size distribution of the monodispersed powders allow for a tight control over the packing of the powder particles in the green ceramic. Since there are very few agglomerates, the particles pack very uniformly with the residual pore sizes in the green ceramic often being on the order of two particle diameters (<1 micron). If dispersions of the powder are slowly settled, very high green densities are attainable due to the statistical ordering of the particles with the residual pore size often on the order of one particle diameter. This is a crucial advantage since residual porosity or agglomerates on the order of a micron (or greater) in size in a fired structural ceramic can act as sources of cracks or defects in the material and lower its overall performance and strength. In processing conventional ceramic powders, the elimination of residual porosity and flaws resulting from poor powder packing and agglomerates is very difficult. This is typically accomplished by application of pressure during densification of the ceramic and by the addition of sintering aids to control grain growth. The application of pressure during high temperature processing is extremely costly and therefore undesirable. Additions such as sintering aids can adversely affect the high temperature properties of the material and therefore are also undesirable. With monosize powders, such processing steps are not necessary to achieve good densities, microstructural uniformity, and sinterability.

In addition to ensuring a more homogeneous green microstructure, monodisperse powders possess special advantages over conventional powders during the firing of the ceramic. Since the sintering temperature is inversely related to the size of the particles, the submicron diameter of the powder particles results in lowering, often by several hundred degrees, the temperature required for sintering the material. The tightly controlled particle size eliminates the problems of differential sintering that can occur in conventional powders where the very small particles begin to sinter ahead of the larger particles in the compact. This process, which often results in undesirably large grain growth and grain size distributions and porosity, can have disasterous consequences for the performance and properties of the ceramic material.

For monosize powders, sintering of the powder particles is rapid and spatially uniform and results in a homogeneous fine grained microstructure in the sintered article. Being a sol-gel derived material, sintering aids, if required, can be included in the powder cheaply and uniformly during the synthesis stage and the composition of the powder can be tightly controlled during processing. These monosized powders offer a unique opportunity for controlling many of the processing variables which now limit the performance and utilization of ceramic products.

Studies have shown that aging of the metal oxide powders can have a profound effect on the surface area and microporosity of the powder. Through appropriate control over the fabrication procedure it should be possible to develop powders and substrates with controlled micro and macroporosity highly useful as adsorbents, gas membrane and biological support materials, scanning electron microscope (SEM) calibrants, high strength structural ceramics and substrates. Presently, titania is used extensively in the construction of oxygen sensors, electronic components, and pigments.

U.S. Pat. No. 4,543,341 reported a route to monodisperse powders by a sol gel route. This work generated a great amount of excitement due to the resurgence of interest in sol gel chemistry and the large number of advantages these materials possess with respect to conventionally formed ceramic powders. In this prior work, a synthetic procedure for producing monodisperse silica from alkoxides was modified and extended to titania and zirconia.

U.S. Pat. No. 4,543,341 also described the synthesis and characterization of a monodisperse, submicron titania powder possessing a spherical shape, uniform dimensions and low state of aggregation. The powder was prepared by mixing equal volume ethanol solutions of titanium tetraethoxide and water and stirring briefly. It was noted that powder isolation procedures must be initiated within thirty minutes of the onset of precipitation, or hard necked aggregates of the individual powder particles would form. Isolation procedures consisted of centrifuging the freshly prepared powder at low speed followed by decantation of the sol. The powder was washed with ethanol followed by washing with alkaline water to impart a negative charge to the titania particle's surface thereby providing a net repulsive interparticle potential which inhibits flocculation of the powders.

BRIEF SUMMARY OF THE INVENTION

This invention relates to a process for reproducibly forming monodisperse titania spheres by the hydrolysis of titanium alkoxides in the presence of an amine containing additive in such a way as to constrain the particle size within a narrow range.

Accordingly, it is an object of this invention to furnish a process which can reproducibly produce monodisperse spheres of titania as a formed compact or as a dispersion in an appropriate liquid medium.

It is a further object of this invention to furnish spheres of titania with an individual particle size in a range of from about 0.1 to about 1 micron and with a standard deviation of the particle size distribution of about onehalf of the average particle diameter, thereby defining the term monodisperse or monosize.

In one aspect an embodiment of this invention is found in a process for making monodisperse titania comprising the steps of:
(a) mixing a titanium tetraalkoxide with an alcohol,
(b) combining at least one amine-containing additive with said solution of step (a),
(c) adding a mixture comprising alcohol and water to the solution of step (b) to form a precipitate of solid monodisperse spheres of titania,
(d) separating said solid monodisperse spheres of titania from said liquid, and
(e) recovering said monodisperse titania spheres.

A further embodiment of the invention is found in a process for increasing the internal porosity of the monodisperse titania particles comprising the aging of dispersions of said titania in mediums such as basic water or titanium-alkoxide based sols.

A still further embodiment of this invention is found in a process for producing green body compacts comprising the addition of a dispersion of said titania particles to a porous mold and the recovery therefrom of said solid green body compact.

Other objects and embodiments will be found in the following further detailed description of the present invention.

DETAILED DESCRIPTION OF THE INVENTION

As hereinbefore set forth, this invention is concerned with the production of monodisperse titania particles from an alcoholic solution of titanium tetraalkoxide containing an amine containing additive by addition of an aqueous medium to said titanium alkoxide solution thereby hydrolyzing said alkoxide to titania particles with subsequent separation and recovery of said monodisperse titania particles. In this manner, a solution of titanium tetraethoxide may be dissolved in ethanol, sec-butyl amine may be added, following which aqueous ethanol may be added to the resultant solution, to afford a precipitation of the desired monodisperse titania particles which can separated from the solution and recovered as spherical solids. If so desired, hydroxypropyl cellulose can be added to the alcohol when mixing with the alkoxide or with the water although it is preferred to be added to the alcohol-water mixture. In addition, the monodisperse titania particles may be redispersed in a redispersing medium and recovered as a dispersion of said titania particles.

The redispersal of the monodisperse titania powder can be effected in any manner known to a person skilled in the arts though it is preferable to redisperse using a high frequency sonication device such as, for example, Vibra Cell made by Sonics Materials, and to utilize a dispersing medium chosen from the group including, but not limited to, ketones alcohols of from one to four carbon atoms, aldehydes, water, chlorinated hydrocarbons, carboxylic acids, and amides.

Depending on the dispersion medium that was chosen and the weight percent loading of the powder in said medium, the redispersed material can be used in a variety of ways. The redispersed material can then be charged into a porous mold and a compact, green body ceramic formed, the material can be cast in the form of a tape, settled slowly into a uniformly packed green ceramic, or the material can be aged from 1 day to 14 days in a medium such as basic water with a pH range of from about 8 to about 11 wherein the preferable base is ammonium hydroxide. The aging conditions include a temperature from 15° C. to about 90° C. and a pressure in the range of from about 1 to about 10 atm and result in a recovered product with a surface area increase that is in a range of from about 100 $m^2/g$ to about 300 $m^2/g$. For instance, the typical unaged product has a surface area of about 5 $m^2/g$ and the aging process increases the surface area to about 200 $m^2/g$.

The titanium tetraalkoxide of this invention, having a formula $Ti(OR)_4$ wherein R represents a lower alkyl group of from one to four carbon atoms, can be selected from the group including, but not limited to, titanium tetramethoxide, titanium tetraethoxide, titanium tetrapropoxide, titanium tetrabutoxide, titanium tetra-sec-butoxide, titanium tetraisopropoxide, titanium methoxytriethoxide, titanium ethoxypropoxydibutoxide, titanium dimethoxydiethoxide and titanium methoxyethoxypropoxybutoxide.

The alcohol of this invention can be selected from the group including, but not limited to, methanol, ethanol, 1-propanol, 1-butanol, 2-propanol, 2-butanol, 2-methyl-2-propanol. It is important to realize that the alcohol, of formula $R^1OH$, has its $R^1$ group selected from lower alkyl groups of from one to four carbon atoms.

In the preparation of this invention, it is preferred that the titanium tetraalkoxide is present in the alcohol at a concentration in the range of from about 0.05 M to about 1.0 M and that the water is present in the alcohol of step (c) in a range of from about 0.1 M to about 1.5 M.

It is important to realize that the water content of the final hydrolysis mixture should not exceed a molarity of water in the range of from about 0.2 M to about 1.5 M and that the starting alcohol for step (a) should have no more water than about 500 parts per million (ppm) with a preferable level of about 200 ppm. Additionally, the water content of the titanium tetraalkoxide ethanol solution should be controlled so as to be in a range of from about 100 ppm to about 300 ppm.

This invention concerns new additive systems which produce monosized titania by sol gel chemistry. Sec-butyl amine and triethyl amine/hydroxypropylcellulose are two such additive systems that are capable of preventing flocculation of the powder particles during precipitation/formation and of giving monodisperse spherical powders directly upon hydrolysis of the titanium alkoxide.

These additives represent a significant advance beyond the described prior art since they provide a method by which highly uniform dispersions of monosize titania particles can be produced in a very reproducible manner.

In the preferred embodiment, amines with alkyl groups of from 1 to 7 carbon atoms in length may be employed to effect the process of this invention. The best results may be obtained for mono- and di-substituted amines when used in the absence of hydroxypropylcellulose (HPC) whereas the best results may be obtained for trialkylamines in the presence of HPC. It is also within the scope of this invention to use mixtures of amines as well as individual amines.

The mono- and di-substituted amines for use in this invention can be selected from the group including, though not limited to, ethylamine, diethylamine, methylamine, dimethylamine, propylamine, dipropylamine, butylamine, dibutylamine, pentylamine, dipentylamine, hexylamine, dihexylamine, heptylamine, diheptylamine, isopropylamine, diisopropylamine, isobutylamine, diiosobutylamine, secbutylamine, disecbutylamine, tert-butylamine, ditertbutylamine, isopentylamine, tert-heptylamine, ethylpropylamine, hexylbutylamine, etc.

Trialkyl amines for use in this invention can be selected from the group including, but not limited to, triethylamine. trimethylamine, triisopropylamine, tributylamine, triisobutylamine, tri-sec-butylamine, tri-tert-butylamine, tripentylamine, triisopentylamine, trihexylamine, triheptylamine, methyldiethylamine, ethylmethylpropylamine, propyldiethylamine, hexylmethylpentylamine, propylethylheptylamine, pentyldibutylamine, etc.

For purposes of this specification and in the appended claims, the terms monodisperse and monosize will be used interchangeably and mean that the particle size distribution is such that the standard deviation of the particle size distribution is less than one-half of the average particle diameter.

In a preferred embodiment, the concentration of secbutylamine is to be in a range of from about 0.001 M to about 0.10 M, the concentration of triethylamine to be in the range of from about 0.001 M to about 0.1 M, and the concentration of hydroxypropylcellulose to be in the range of from about 0.5 to 5 weight percent based on alkoxide. Alternatively, triethylamine may be present in an amount in the range of from about 1 to about 6 mole percent based on titanium metal.

These amine additives, in addition to controlling the relative sphericity of the powder particles, are extremely effective in controlling the average particle size of the precipitated powder. Simply changing the concentration of an amine containing additive may result in an increase or decrease in the average size of the titania particles, while still preserving the narrow size distribution of the powder. This size change is achieved while keeping both the water and alkoxide reagent concentrations (as well as other reaction conditions) constant and represents a fundamental advance in the processing of these materials which was not obvious and represents a significant advance over the processes heretofore known.

While it is clear that size control additives are critical to the success of the reaction schemes described within, their role in the process is not clear. Unlike organic polymerization reactions which are well defined, the inorganic polymerization chemistry of metal alkoxides is very complex. The structures of many of the metal alkoxides are not explicitly known, since they exist as mixtures of oligomers in solution. The ratios between the various oligomers present in the solution are expected to be affected by factors such as distillation, the presence of other Lewis bases such as alcohols or amines, and the manufacturing procedures used in their synthesis. The presence of small quantities of water will also affect not only the molecular structure and composition of the metal alkoxide oligomers, but the relative hydrolysis rates of those compounds. What results from this gigantic matrix of variables is an extremely complex chemical system which constitutes our starting material for the synthesis of monodisperse metal oxide powders. Thus the development of additive systems such as those described within that permit the reproducible synthesis of monodisperse titania powders from such complex starting materials acquired all the more significance.

The synthesis of monodisperse powders by sol gel techniques requires that several critical criteria be met during the nucleation and growth stages of particle formation. One of the most critical elements in this process is the homogeneity of the solution. In order to form a monodisperse powder by solution precipitation techniques, homogeneous nucleation and growth of the particles must occur, thus requiring that possible nucleation sites be removed from the solvent prior to precipitation. Such removal is commonly achieved by filtering the reagent solutions through a submicron filter (Millipore), thereby effectively removing any dust or fine precipitates which could act as nucleation sites and give rise to a nonuniform rate of nucleation and growth of the metal oxide particles.

It is also important, particularly for hydrolysis reactions of metal alkoxides, that the hydrolysis reactions proceed at a rate sufficient to assure the rapid growth and precipitation of the material, yet not too rapid that precipitation occurs immediately upon reagent addition. If the reaction is extremely rapid, local areas of supersaturation develop in the sol with the concomitant formation of non-uniform precipitates. Thus the solution must be uniform with no local supersaturation, and particle growth must proceed at an appreciable rate following the initial precipitation.

Another aspect which must be incorporated into any successful reaction scheme is to stabilize the particles during their growth in the sol, a very critical factor in the nonreproducibility of the reaction chemistry for titania. During the early growth stages of the particle, the particle's surface must be sufficiently charged, or otherwise sterically stabilized such that interparticle forces are of a repulsive nature and provide a barrier to hard aggregate formation. For powders which are synthesized in pH conditions close to the zeta potential of the metal oxide, "agglomeration" processes (flocculation followed by precipitation of material on the flocculated particle clusters) are certain to occur in concentrated dispersions of the powders, unless they have been stabilized in some manner. This is the major problem which needed to be resolved in order to reproducibly synthesize monodisperse titania powders from alkoxides.

The process of this invention can be effected in a batch manner whereby the titanium tetraalkoxide is mixed with the alcohol in a suitable vessel, followed by subsequent addition of the amine containing additive and the aqueous alcohol medium. After a suitable period of mixing, the resultant solid monodisperse titania particles are separated from the reaction mixture, washed with a suitable washing medium, and recovered as solid particles.

The separation step of the process of this invention can be carried out by any means known to those skilled in the art, including such means as gravity settling, batch or continuous centrifugation, and filtration. Precipitation times in the range of from about 0.1 to about 30 minutes are preferred.

The redispersing medium can be selected from the group including, but not limited to, ketones, water, alcohols of from one to four carbon atoms, aldehydes, chlorinated hydrocarbons, carboxylic acids, amines, and solutions of acids or bases.

Prior to the final separation of the monodisperse powder body from the liquid, the reaction liquid can be separated and the body can be washed several times with a liquid taken from the group including, but not limited to, water and alcohols of from one to four carbon atoms.

Alternatively, the precipitation reaction may be effected in a continuous manner of operation. When this type of operation is employed, a quantity of solution A, comprising titanium tetraaikoxide, ethanol and the amine additive, is continuously prepared from its constituent reagents and charged into a quantity of solution B, comprising water and ethanol, which has been placed in a suitable vessel maintained at the proper operating conditions of temperature and pressure. After a suitable time of mixing in the reactor, effluent is continuously withdrawn and subjected to conventional means of separation whereby the desired titania powder is recovered, and the withdrawn stream can be recycled, if so desired. The recovered titania can be redispersed as in the batch reaction or recovered as a solid product.

The monodisperse titania particles are produced in a relatively narrow range of particle size corresponding to a standard deviation of the particle size distribution of less than one-half of the average particle diameter whereas the prior work produced particle size markedly exceeding 1 micron, poor uniformity, with standard deviations no less than the average particle diameter. The present invention produces spherical uniform particles in a particle size range of from about 0.1 to about 1.0 micron in contradistinction to the prior work where experiments produce particle sizes in excess of 1 micron. The well defined, spherical shape and narrow range of particle size, which is obtainable when employing the process of the present invention, fulfills a long felt need in the ceramic industry for a powder capable of forming high density, microstructurally uniform, green body compacts.

In contradistinction to the published literature, the titania particles which are obtained from processes known in the literature are not reproducible and that the product of said known processes was found by scanning electron microscopy (SEM) to be highly agglomerated with an average particle size of 1.2 microns as determined by the Leeds and Northrup small particle analyzer (SPA). The prior work reported a particle size of 0.3–0.7 microns whereas, despite extensive and exhaustive attempted replication of this work, the disclosed procedure produced resultant particles which were hard, necked inseparable aggregates with a 1.2 micron size and made up of approximately spherical 0.3 micron particles of titania.

For purposes of this specification and in the appended claims the term "compact" will be defined to include both the separated, non-redispersed titania as well as the formed solid titania resulting from the action of a porous mold on the dispersion of monodisperse titania, or by other forming procedures known to a person skilled in the art. Additionally the term "green body" will be defined to mean an unfired, pre-ceramic compact.

The following examples are given for purposes of illustration. However, it is to be understood that these examples are only illustrative in nature and that this invention is not necessarily limited thereto.

EXAMPLE I

In order to differentiate this invention from prior work, products were made utilizing procedures described in the literature.

The titanium tetraethoxide was obtained from three different manufacturers, was purified by vacuum distillation, and carefully handled under an inert nitrogen atmosphere to insure that exposure to atmospheric moisture was kept to a minimum. All of the reaction solutions were filtered through a 0.4 micron Millipore filter (nylon) just prior to their use. All of the solution handling operations were carried out under a dry, inert atmosphere of nitrogen.

The particle size distribution values were obtained on a Leeds and Northrup Small Particle Analyzer (SPA). This instrument measures the particle size distributions over a range of 0.1–35 microns by laser light scattering. A scanning electron microscope (SEM) was used to check the SPA-determined particle size values and to examine the morphology of the powder particles. Excellent agreement was always obtained between the SEM and SPA size data providing that proper precautions were taken to insure that proper powder sampling procedures were followed.

Following the known reported procedure, a dilute, 0.2 molar (M) solution of titanium tetraethoxide in anhydrous ethanol was added to a solution of water in ethanol [0.83 M] to give a precipitation time for this experiment of about 10 seconds. After thirty minutes, The resultant powder was washed with ethanol, redispersed in a pH 10 solution of deionized water, and the particle size was determined by SPA. The average SPA particle size of 1.3 microns is several times greater than that claimed in the prior work for this material. An SEM micrograph of the powder clearly shows the particle surfaces to be curved or spherical with most of the particles in the 0.3 micron size range present in hard necked aggregates.

In addition, the surface at 30,000 magnification appears to be fairly smooth, exhibiting very little microstructure. Although the particle size is not correct, the surface appearance of the powder closely matches the description of the powder reported for this material. This observation is important since the powders prepared utilizing a variety of different additives have surface microstructures markedly different from those of the prior work.

The precipitation times observed for comparable reagent concentrations were very close to the literature values. In general, a decrease in either the water or alkoxide concentrations resulted in a longer precipitation time, but the key product discrepancies entailed the morphologies and sizes of the powder particles. The material obtained upon duplication of the prior procedures consistently gave nonuniform, agglomerated powders with average particle diameters of over one micron as determined by SPA and independently verified by SEM.

A large number of alternate reagent concentrations, reaction temperatures, and experimental conditions were examined. The particle size and microstructure of the titania powders prepared by these procedures were remarkably invariant to changes in the processing conditions. These changes included utilizing titanium ethoxide in the reactions in its as-received, first distilled and second fraction distilled forms, along with the 200 proof anhydrous ethanol. Reactions were run using deionized water (18 megohm) and distilled water.

In addition to these precautions, careful attention was given to solution handling, powder washing, isolation, and redispersion procedures following powder precipitation. Precipitation reactions were run statically, or with slow or vigorous stirring, and centrifugation rates were varied as were the sonication power and solvents used to redisperse the powders. The results of over 40 experiments utilizing processes found in prior publications disclosed the fact that the particles which were obtained did not reproduce the claimed results.

EXAMPLE II

This example was performed to show the effect of triethylamine incorporation into the reported experimental procedures. A [0.2 M] solution of the alkoxide containing 2 mole percent of triethylamine (based on Ti) was prepared and mixed with a 0.83 M solution of water in ethanol as described as in Example I. With this incorporation, the precipitation time of the solid titania increased from 10 seconds to 35 seconds and the powder precipitated from the sol in a highly flocculated state exhibiting an average particle size of 10.4 microns. Upon redispersing the isolated powder sample in pH 10 water, the average SPA particle size of the powder was reduced to 1.1 micron, a value very comparable to that obtained for the unmodified synthesis (1.06 micron) as carried out in Example I.

The laser light scattering and SEM characterization results of the experiments with triethylamine clearly showed that the freshly precipitated powders were highly agglomerated and even upon redispersion in basic water failed to produce a material with an average particle size less than 0.9 microns. Despite purifying the amine by distillation from barium oxide, the powder which was produced using the distilled amine, exhibited a similar particle size distribution, to that obtained using the undistilled material.

EXAMPLE III

In order to observe the effect of a primary amine additive, an alkoxide solution (A) was prepared by mixing 4 mL of freshly distilled titanium tetraethoxide (Ti(OEt)$_4$), 10 microliters of sec-butyl amine and 100 mL of dry ethanol together under an inert atmosphere of dry nitrogen. The hydrolysis solution (B) was prepared by adding 3mL of distilled water to 100mL of absolute ethanol. Both solutions were then individually filtered through a 0.4 micron Millipore nylon filter under nitrogen to remove fine particulates from the solutions. The hydrolysis was carried out by taking equal volume portions of both solutions and mixing them vigorously for several seconds, after which the well-mixed solution was allowed to remain undisturbed for 30 minutes. The initially transparent solution became turbid 13 seconds after mixing. The resulting milky dispersion of titania powder was centrifuged for 20 minutes, the ethanol was decanted from the powder compacts, and the powder was ultrasonically dispersed in a small quantity of ethanol. The powder was then again isolated by centrifugation, redispersed in pH 10 water and the particle size distribution measured by light scattering using a Leeds and Northrup Small Particle Analyzer (SPA). The average size of the titania particles was 0.88 microns. SEM micrographs of a dried portion of the powder dispersion independently confirmed the uniform, spherical particle morphology and particle size distribution of the precipitate.

EXAMPLE IV

This example was run as a control experiment in tandem with Example V utilizing the same stock solutions of water and alkoxide. Utilizing the basic method of Example III, a Millipore filtered solution of 4 mL of freshly distilled Ti(OEt)$_4$ in 100 mL absolute ethanol was added to a similarly filtered solution of 1.5 mL distilled water in 100 mL ethanol under an atmosphere of dry nitrogen. The resulting solution was swirled briefly and then allowed to remain undisturbed for twenty minutes. The initially transparent reaction solution became cloudy 28 seconds after mixing, and, after equilibrating for thirty minutes, the solution was examined visually. Large clumps of powder particles were seen in the sol and were clear evidence that flocculation had occurred. The average size of the precipitate measured by laser light scattering was 9.56 microns and in agreement with the visual observation of clumping. Attempts to reduce the average particle size of the precipitate by ultrasonically redispersing a centrifuged compact at high power in either ethanol or pH 10 water was only moderately successful. While the average size of the redispersed material was smaller, it was always greater than 1 micron in diameter. Examination of the powder by SEM revealed that the powder particles largely consisted of hard, necked aggregates of 0.3 micron titania particles. From the average SPA determined particle size of 1.3 microns, it is estimated from the SEM micrographs that the "average titania particle" in this sample consisted of an agglomerate of 3 or more 0.3 micron primary particles of titania.

EXAMPLE V

This example was run to show the effect of the amine addition of the invention to the control experiment of Example IV. To a solution of titanium ethoxide in ethanol prepared as in Example IV was added 18 microliters of freshly distilled sec-butyl amine. This solution was filtered through a 0.45 micron Millipore filter and then added to a solution of 1.5 mL of distilled water in 100 mL ethanol. This reaction, run concurrently with the unmodified reaction described in Example IV, became turbid 30 seconds after mixing of the solutions. The appearance of the dispersion, in contrast to that described above, had a very uniform (milky) appearance with no evidence of large precipitates being visually apparent. The average particle size of the dispersion measured by light scattering and independently confirmed by SEM measurements, was found to be 0.75 microns. In addition, the powder was found to have a spherical particle morphology by SEM.

EXAMPLE VI

This example demonstrates the effect of increasing the concentration of the amine of the present invention. Using the method described in Example V, 4 mL of distilled Ti(OEt)$_4$ was dissolved in 100 mL of absolute ethanol and 57 microliters of sec-butyl amine was added to form Solution A. After filtering through a Millipore filter, Solution A was mixed with filtered Solution B, comprising 1.5 mL of water in 100 mL absolute ethanol.

The resulting solution became turbid in 55 seconds. The average particle size of the precipitated titania particles was 0.47 microns and was highly uniform in size and particle morphology. In comparison with Examples III and V above, it can be seen that an increase in sec-butyl amine in Solution A produced an reduction in size of the titania particles from 0.88 microns in Example III to 0.75 microns in Example V to 0.47 microns in the present example as shown in Table I below:

TABLE I

| TITANIA PARTICLE SIZE | | |
|---|---|---|
| EXAMPLE | Sec-butyl Amine | Particle Size |
| III | 10 microliters | 0.88 microns |
| V | 18 microliters | 0.75 microns |
| VI | 57 microliters | 0.47 microns |

EXAMPLE VII

A solution of 8 mL of titanium tetraethoxide (Ti(OEt)$_4$) in 200 mL of absolute ethanol was prepared and filtered as in Example IV and then mixed with 0.27 g of hydroxypropylcellulose (HPC) with vigorous shaking to form Solution A which was then added to Solution B, comprising 3 mL of water in 200 mL of absolute ethanol. Turbidity appeared after 24 seconds. After a thirty minute equilibration, the solution was centrifuged to give a powder compact which was washed as before. The average particle size of the spherical titania precipitate was 0.21 microns.

EXAMPLE VIII

In like manner as in Example VII, except that Solution A now contained 106 microliters of triethyl amine, Solutions A and B were mixed and the resultant powder compact treated as before to give an average particle size of 0.59 microns for the highly spherical titania powder. A comparison of Examples VII and VIII shows that the addition of triethylamine, in accord with the present invention, to the HPC increased the average size of the titania powder from 0.21 microns to 0.59 microns while preserving the sphericity of the particles.

EXAMPLE IX

A series of reactions were run as described above in Example III in order to determine the effect of various types of amines on the hydrolysis chemistry of titanium ethoxide. In a typical reaction, 2 mL of Ti(OEt)$_4$ was dissolved in 50 mL of ethanol with 3 mole percent of a particular amine (based on titanium). This solution was filtered through a submicron Millipore filter under nitrogen and then added to a solution of 0.75 mL of water in 50 mL of ethanol. The reaction solution, which was always initially transparent, was swirled rapidly to ensure good mixing and then allowed to remain undisturbed for 30 minutes. The onset of turbidity was found to be dependent on the identity of amine, ranging from 27 to 45 seconds. Small portions of the powders were removed and characterized by light scattering and SEM. The powder particles were found to be highly uniform spheres with a narrow size distribution. The results are summarized in Table 2 below:

TABLE 2

| AMINE | AMOUNT ADDED | ONSET OF TURBIDITY | PARTICLE SIZE |
|---|---|---|---|
| Isopropyl | 25 microliters | 45 sec | 0.50 |
| Diethyl | 31 microliters | 43 sec | 0.50 |
| Propyl | 24 microliters | 30 sec | 0.87 |
| Butyl | 29 microliters | 32 sec | 0.75 |
| Di-butyl | 50 microliters | 40 sec | 0.44 |
| Hexyl | 39 microliters | 27 sec | 0.62 |
| sec-butyl | 28 microliters | 45 sec | 0.71 |

We claim as our invention:

1. A process for the production of monodisperse titania particles comprising the steps of:
   (a) dissolving titanium tetraalkoxide in an alcoholic medium to form a solution of said alkoxide in said alcoholic medium;
   (b) providing a hydrolysis solution comprising alcohol and water in amounts sufficient to hydrolyze said alkoxide in said solution;
   (c) adding said hydrolysis solution to said solution of said alkoxide to hydrolyze said alkoxide at hydrolysis conditions to form a dispersion of monodisperse titania particles, said hydrolysis being conducted in the presence of a component selected from the group consisting of (1) monoalkyl amines, (2) dialkyl amines, (3) trialkyl amines in combination with hydroxypropylcellulose and (4) mixtures thereof, said alkyl substituent having from 1 to 7 carbon atoms; and
   (d) separating and recovering said monodisperse titania particles from said dispersion.

2. The process as set forth in claim 1 further characterized in that said titanium tetraalkoxide has the formula Ti(OR)$_4$ wherein each R represents a lower alkyl group of from one to about four carbon atoms.

3. The process as set forth in claim 1 further characterized in that said alcohol has the formula R$^1$OH in which R$^1$ represents lower alkyl groups of from one to four carbon atoms.

4. The process as set forth in claim 1 further characterized in that said titanium tetraalkoxide is present in said alcohol of step (a) at a concentration in the range of from about 0.05 M to about 1.0 M.

5. The process as set forth in claim 1 further characterized in that said titanium tetraalkoxide is selected from the group consisting of titanium tetraethoxide, titanium tetramethoxide, titanium tetrapropoxide, titanium tetrabutoxide, titanium methoxytriethoxide, titanium ethoxypropoxydibutoxide, and titanium dimethoxydiethoxide.

6. The process as set forth in claim 1 further characterized in that said alcohol is selected from the group consisting of ethanol, methanol, 1-butanol, 1-propanol, 2-propanol, 2-butanol, and 2-methyl-2-propanol.

7. The process as set forth in claim 1 further characterized in that said water is present in said alcohol of step (b) in the range of from about 0.1 M to about 1.5 M.

8. The process as set forth in claim 1 further characterized in that said component is selected from the group consisting of isopropylamine, diethylamine, propylamine, butylamine, sec-butylamine, di-butylamine and hexylamine.

9. The process as set forth in claim 8 further characterized in that said component is sec-butyl amine and is present in an amount in the range of from about 0.001 M to about 0.1 M.

10. The process as set forth in claim 1 further characterized in that said component is a mixture comprising triethylamine and hydroxypropylcellulose.

11. The process as set forth in claim 10 further characterized in that the triethylamine is present in an amount in the range of from about 1 to about 6 mole percent, based on titanium.

12. The process as set forth in claim 10 characterized in that said hydroxypropylcellulose is present in an amount in the range of from about 0.5 to about 5 weight percent based on the titanium tetraalkoxide.

13. The process as set forth in claim 1 further characterized in that the size of said monodisperse titania particles ranges from about 0.1 micron to about 1 micron.

* * * * *